(12) United States Patent
Le et al.

(10) Patent No.: US 10,884,755 B1
(45) Date of Patent: Jan. 5, 2021

(54) GRAPH REWRITING FOR LARGE MODEL SUPPORT USING CATEGORIZED TOPOLOGICAL SORT

(71) Applicant: INTERNATIONAL BUSINESS MACHINES CORPORATION, Armonk, NY (US)

(72) Inventors: Tung D. Le, Chiba (JP); Haruki Imai, Kanagawa (JP); Yasushi Negishi, Tokyo (JP); Kiyokuni Kawachiya, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/527,280

(22) Filed: Jul. 31, 2019

(51) Int. Cl.
*G06F 9/38* (2018.01)
*G06T 1/60* (2006.01)
(Continued)

(52) U.S. Cl.
CPC .......... *G06F 9/3855* (2013.01); *G06F 9/3838* (2013.01); *G06T 1/20* (2013.01);
(Continued)

(58) Field of Classification Search
CPC . G06T 11/206; G06T 1/60; G06T 1/20; G06T 17/005; G06T 2207/20081;
(Continued)

(56) References Cited

U.S. PATENT DOCUMENTS 9,305,076 B1 *  4/2016 Kadarkarai .......... G06F 16/285
2017/0124451 A1 * 5/2017 Barham ................ G06F 9/5038
(Continued)

OTHER PUBLICATIONS

Heath, "Laying Out Graphs Using Queues", Siam Journal on Computing, Oct. 1992, 40 pages.
(Continued)

*Primary Examiner* — Maurice L. McDowell, Jr.
*Assistant Examiner* — Donna J. Ricks
(74) *Attorney, Agent, or Firm* — Tutunjian & Bitetto, P.C.; Randall Bluestone

(57) ABSTRACT

A computer-implemented method is provided for managing GPU memory consumption by computational graph rewriting. The method includes constructing, by a hardware processor, a categorized topological ordering of a computational graph. The categorized topological ordering includes multiple computational nodes arranged in multiple levels. The method further includes estimating, by the hardware processor, the GPU memory consumption responsive to a level including two or more computational nodes from among the multiple computational nodes. The method also includes rewriting, by the hardware processor, the computational graph by linearizing the two or more computational nodes in the level to avoid overlapping of the GPU memory consumption by the two or more computational nodes responsive to the GPU memory consumption exceeding a threshold. The memory additionally includes managing the GPU memory consumption in accordance with the rewritten computational graph.

20 Claims, 16 Drawing Sheets

(51) Int. Cl.
*G06T 1/20* (2006.01)
*G06N 3/02* (2006.01)
*G06T 11/20* (2006.01)

(52) U.S. Cl.
CPC .................. *G06T 1/60* (2013.01); *G06N 3/02* (2013.01); *G06T 11/206* (2013.01)

(58) Field of Classification Search
CPC .... G06F 9/3855; G06F 9/3838; G06F 3/0608; G06F 3/0653; G06F 3/0604; G06F 9/5066; G06N 20/00; G06N 3/04; G06N 3/02; G06N 3/0454
See application file for complete search history.

(56) References Cited

U.S. PATENT DOCUMENTS

| | | | |
|---|---|---|---|
| 2017/0221238 A1* | 8/2017 | Limberger | G06T 15/005 |
| 2019/0005407 A1 | 1/2019 | Harris et al. | |
| 2019/0073590 A1* | 3/2019 | Wu | G06T 1/20 |
| 2020/0065156 A1* | 2/2020 | Nag | G06N 20/00 |

OTHER PUBLICATIONS

Meng et al., "Training Deeper Models by GPU Memory Optimization on TensorFlow", 31st Conference on Neural Information Processing Systems (NIPS 2017), pp. 1-8.
Onus et al., "Linearization: Locally Self-Stabilizing Sorting in Graphs", Conference: Proceedings of the Workshop on Algorithm Engineering and Experiments, Alenex 2007, Jan. 2007, pp. 1-10.
Vandenhove, "Functional Design of Computation Graph", arXiv:1812.03770v1 [cs.MS] Dec. 10, 2018, pp. 1-14.

* cited by examiner

1400 for each f that has swap-out operations:
  for op1 in *swap_out operations*:
    for op2 in union(*control_outputs, normal operations*):
      - get memory consumption of all ops of the same level as op2
      - check if there is enough memory for op1?
      - if YES, there is no need to flatten
      - if NO, flatten op1 by adding control edges from op1 to all ops of the same level as op2

FIG. 14

1600 for each f that has swap-out operations:
  for op1 in *swap_out operations*:
    for op2 in union(*control_outputs, normal operations*):
      - get memory consumption of all ops of the same level as op2
      - check if there is enough memory for op1?
      - if YES, there is no need to flatten
      - if NO, flatten op1 by adding control edges from op1 to all ops of the same level as op2

FIG. 16

GRAPH REWRITING FOR LARGE MODEL SUPPORT USING CATEGORIZED TOPOLOGICAL SORT

BACKGROUND

The present invention generally relates to information processing, and more particularly to graph rewriting for model support using categorized topological sort.

Deep neural networks are becoming deeper and larger. As a result, they often do not fit GPU memory. Accordingly, there is a need for an approach to support such networks in GPU memory.

SUMMARY

According to an aspect of the present invention, a computer-implemented method is provided for managing GPU memory consumption by computational graph rewriting. The method includes constructing, by a hardware processor, a categorized topological ordering of a computational graph. The categorized topological ordering includes multiple computational nodes arranged in multiple levels. The method further includes estimating, by the hardware processor, the GPU memory consumption responsive to a level including two or more computational nodes from among the multiple computational nodes. The method also includes rewriting, by the hardware processor, the computational graph by linearizing the two or more computational nodes in the level to avoid overlapping of the GPU memory consumption by the two or more computational nodes responsive to the GPU memory consumption exceeding a threshold. The memory additionally includes managing the GPU memory consumption in accordance with the rewritten computational graph.

According to another aspect of the present invention, a computer program product is provided for managing GPU memory consumption by computational graph rewriting. The computer program product includes a non-transitory computer readable storage medium having program instructions embodied therewith. The program instructions are executable by a computer to cause the computer to perform a method. The method includes constructing, by a hardware processor, a categorized topological ordering of a computational graph. The categorized topological ordering includes multiple computational nodes arranged in multiple levels. The method further includes estimating, by the hardware processor, the GPU memory consumption responsive to a level including two or more computational nodes from among the multiple computational nodes. The method also includes rewriting, by the hardware processor, the computational graph by linearizing the two or more computational nodes in the level to avoid overlapping of the GPU memory consumption by the two or more computational nodes responsive to the GPU memory consumption exceeding a threshold. The method additionally includes managing the GPU memory consumption in accordance with the rewritten computational graph.

According to yet another aspect of the present invention, a computer processing system is provided for managing GPU memory consumption by computational graph rewriting. The computer processing system includes a memory for storing program code. The computer processing system further includes a hardware processor, operatively coupled to the memory, for running the program code to construct a categorized topological ordering of a computational graph. The categorized topological ordering including multiple computational nodes arranged in multiple levels. The processor further runs the program code to estimate the GPU memory consumption responsive to a level including two or more computational nodes from among the multiple computational nodes. The processor also runs the program code to rewrite the computational graph by linearizing the two or more computational nodes in the level to avoid overlapping of the GPU memory consumption by the two or more computational nodes responsive to the GPU memory consumption exceeding a threshold. The processor additionally runs the program code to manage the GPU memory consumption in accordance with the rewritten computational graph.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 14 is a diagram showing an exemplary algorithm for flattening swap-out operations, in accordance with an embodiment of the present invention;

FIG. 16 is a diagram showing an exemplary algorithm for flattening swap-in operations, in accordance with an embodiment of the present invention.

DETAILED DESCRIPTION

Embodiments of the present invention are directed to graph rewriting for model support using categorized topological support.

Embodiments of the present invention are particularly suited for Large Model Support (LMS).

Embodiments of the present invention can be used to train a neural network using one GPU, where the neural network itself is represented by a computational graph. The present invention can apply to arbitrary edges in a computational graph.

Figure 1:
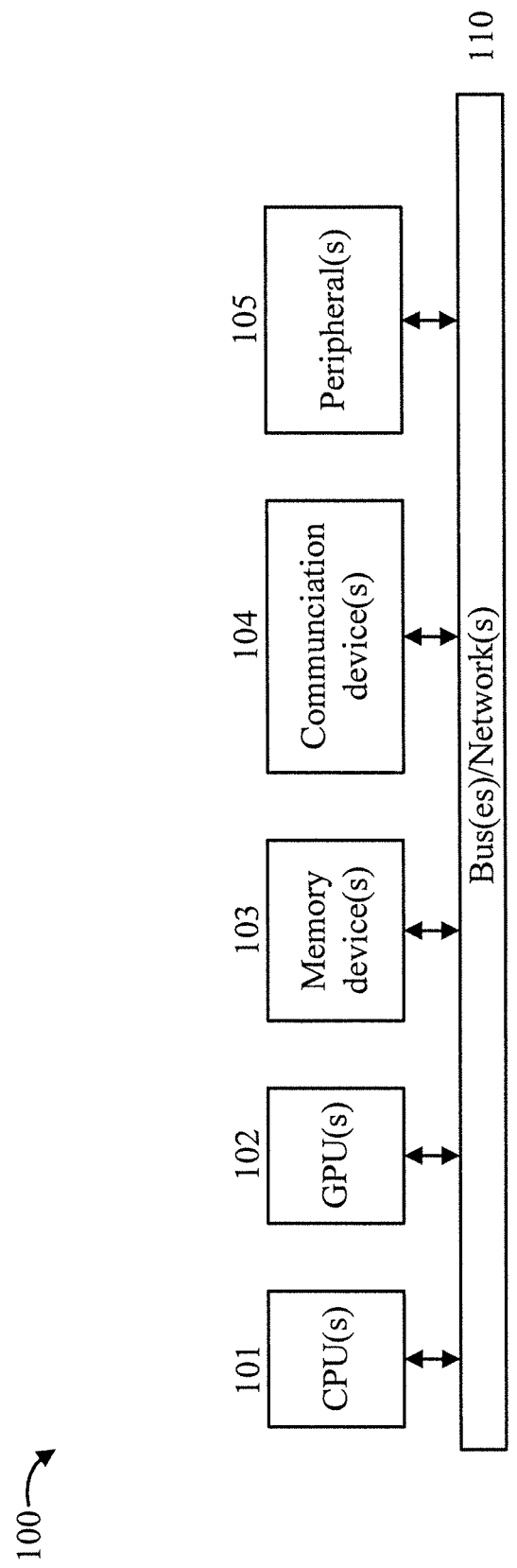
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
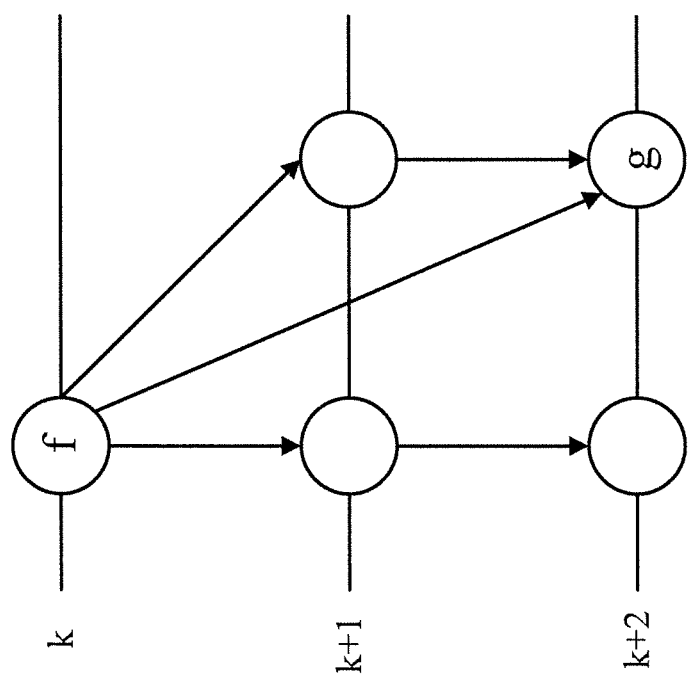
FIG. 2 is a block diagram showing an exemplary categorized topological sort on a computational graph of a neural network, in accordance with an embodiment of the present invention.

FIG. 2 is a block diagram showing an exemplary categorized topological sort 200 on a computational graph of a neural network, in accordance with an embodiment of the present invention.

Given a computational graph of a neural network, a categorized topological sort is performed by classifying the topological sort into L levels, where operations in the same level do not depend on each other, and where operations at level k do not depend on operations at level>k.

The distance between nodes f and g is calculated follows:

Distance(f,g)=L(g)−L(f), where L returns the level of an operation.

The larger the distance between two operations in GPU memory, the longer the tensor is between the two operations. Edges with a distance greater than a given threshold are targeted for rewriting for large model support.

Figure 3:
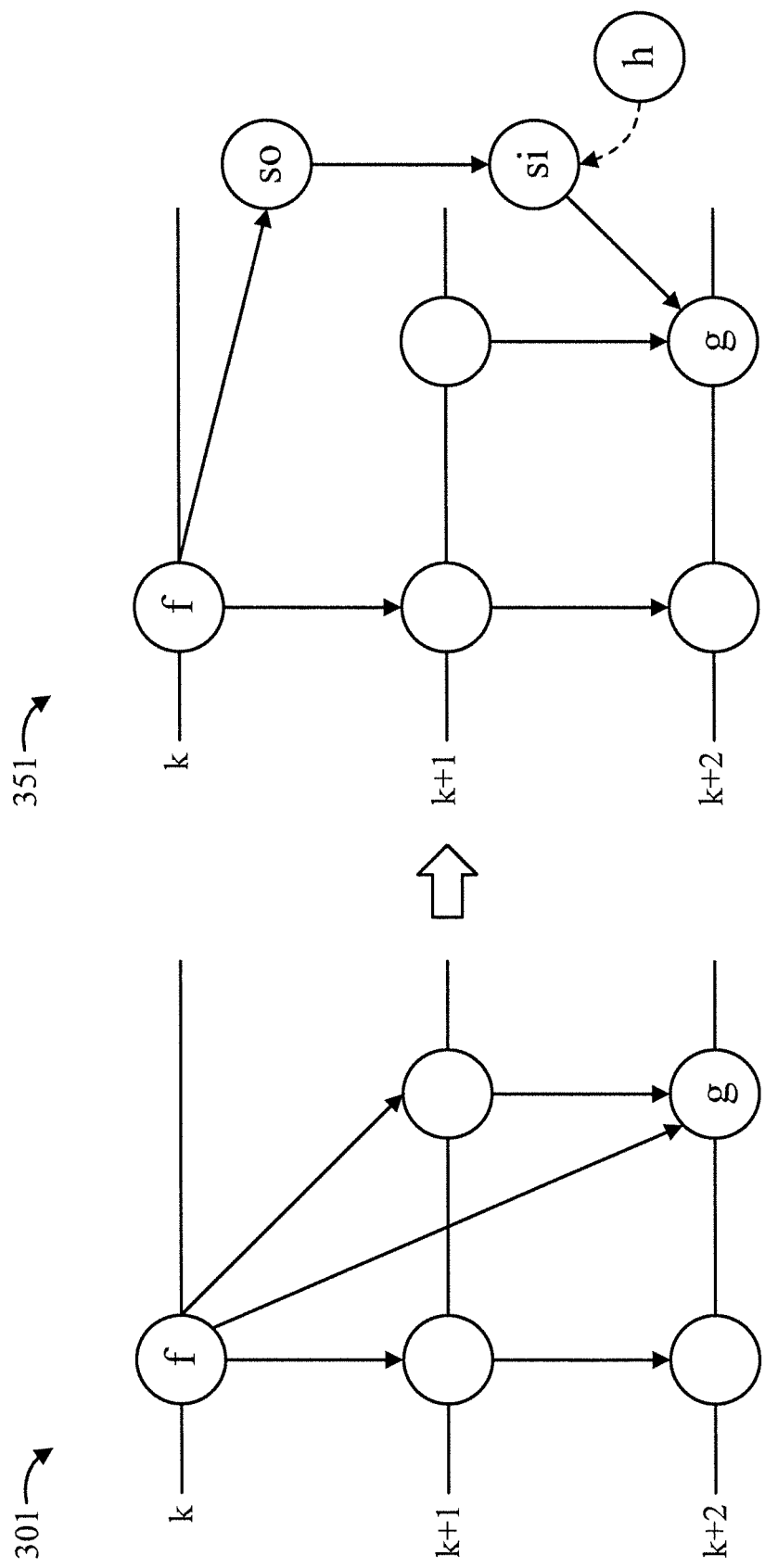
FIG. 3 is a block diagram showing an exemplary addition of swap-out and swap-in operations, in accordance with an embodiment of the present invention.

FIG. 3 is a block diagram showing an exemplary addition 300 of swap-out and swap-in operations, in accordance with an embodiment of the present invention.

The swap-out and swap-in operations are performed relative to an original graph 301, a rewritten graph 351, and swap-out/swap-in criteria. The swap-out/swap-in criteria is as follows: If L(g)−L(f)>threshold, then perform a swap-out/swap-in.

In FIG. 3, "so" denotes swap-out, and "si" denotes swap-in.

Presuming here for the sake of illustration that L(g)−L(f) >threshold, the link from f to g in the original graph 301 will be rewritten in the rewritten graph 351.

The intent here is to rewrite the original graph 301 so that only data for the current operation resides in the GPU at a given time.

Since one output tensor can be an input for multiple operations, for each tensor, we have one swap-out operation and multiple swap-in operations. In particular, two CPU operations are inserted, namely a so and si for data swap, and also a swap-in is triggered by a control edge from an operation h.

Figure 4:
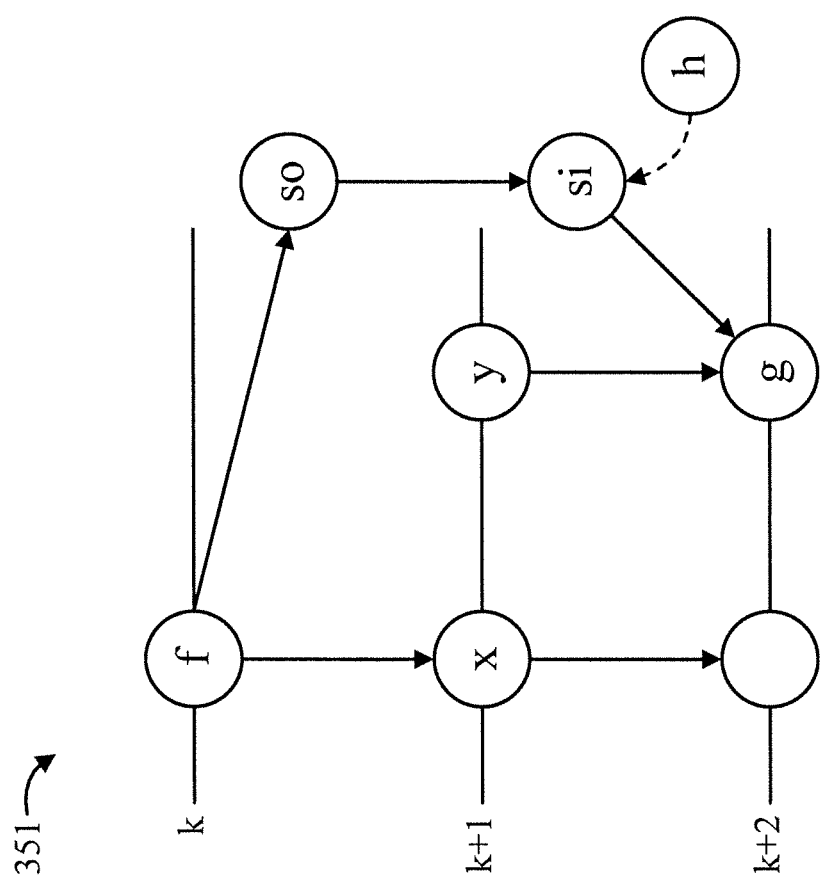
FIG. 4 is a diagram showing an exemplary computational graph, in accordance with an embodiment of the present invention.

FIG. 4 is a diagram showing an exemplary computational graph 400, in accordance with an embodiment of the present invention. The computational graph has node f at one level, nodes x and y at another level, and node g at yet another level. The computational graph further includes swap-out operation so, swap-in operation si, and operation h, where the swap-in is triggered for a control edge from operation h.

Figure 5:
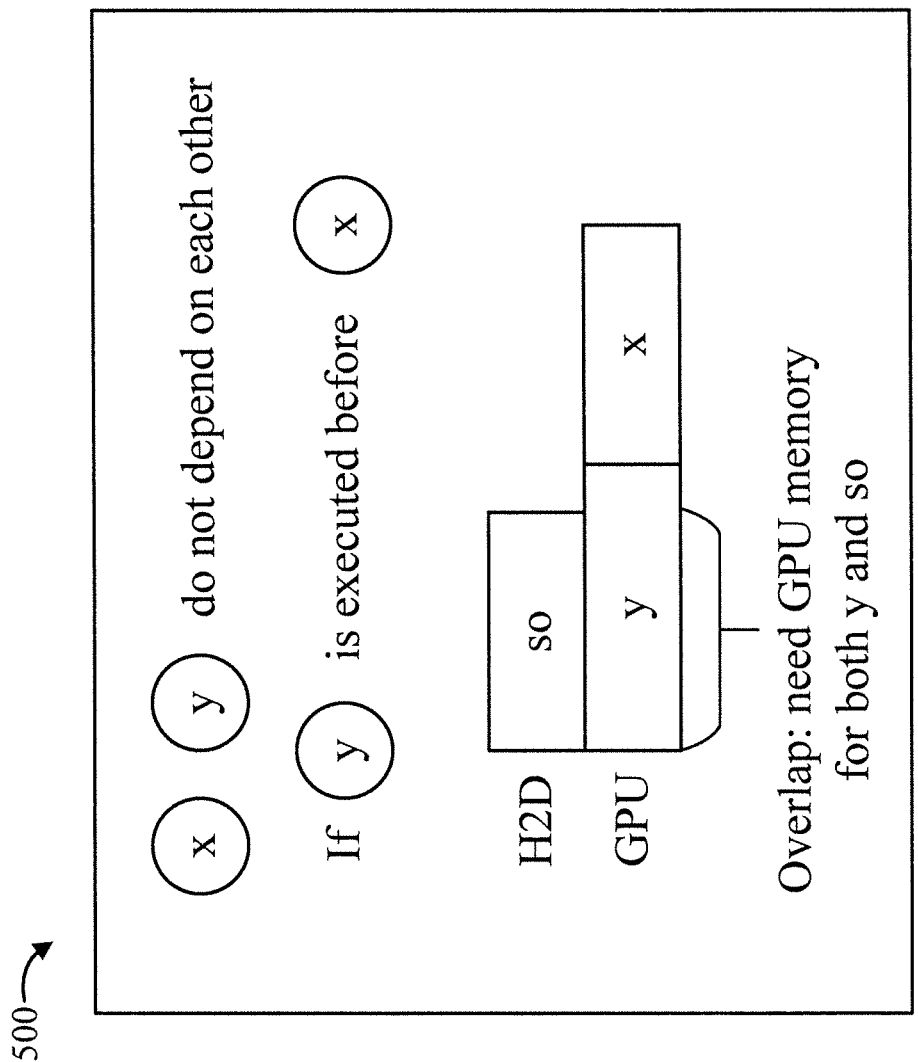
FIG. 5 is a diagram showing an exemplary problem 1 to which the present invention can be applied, in accordance with an embodiment of the present invention.

FIG. 5 is a diagram showing an exemplary problem 1 500 to which the present invention can be applied, in accordance with an embodiment of the present invention. The present invention can be readily applied to solve problem 1 500, as described in further detail herein below. Problem 1 makes training consume more memory than expected at a given time.

In further detail, problem 1 involves needing GPU memory for both y and so.

If operations x and y do not depend on each other, and y is executed before x, then problem 1 occurs. In further detail, problem 2 involves needing GPU memory for both y and so.

Figure 6:
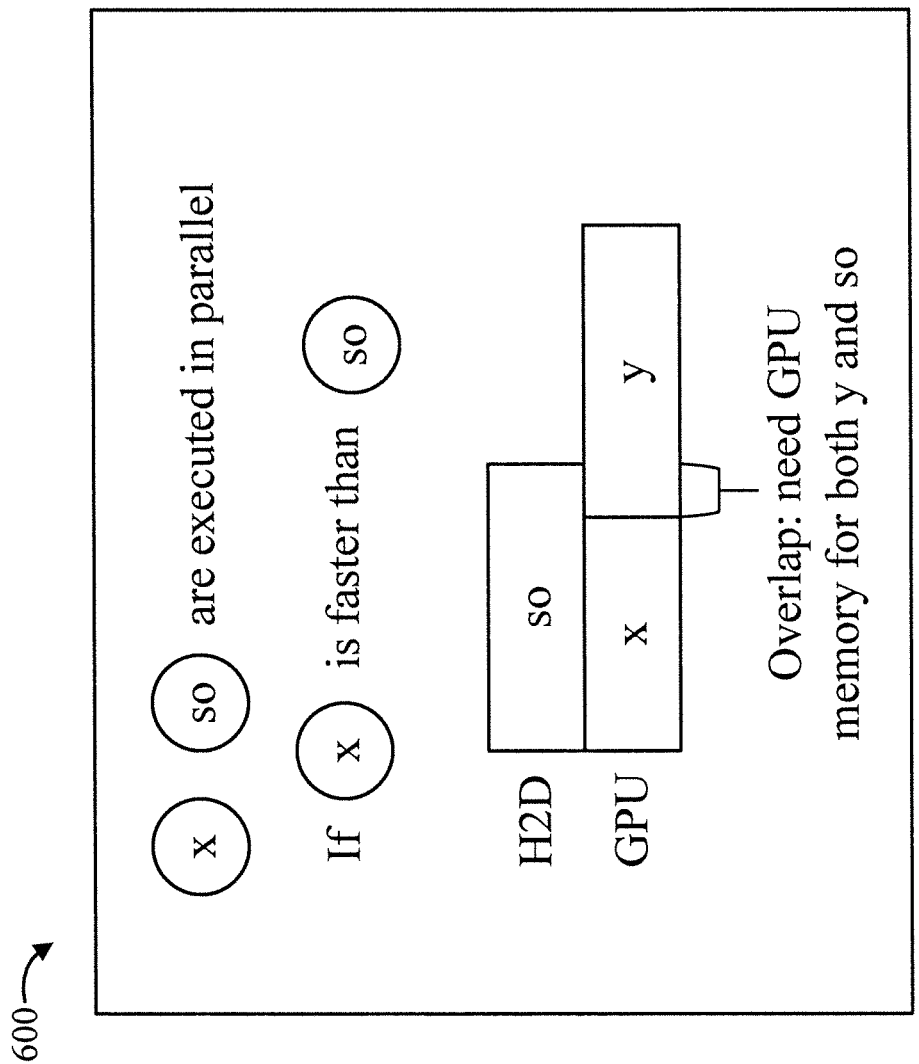
FIG. 6 is a diagram showing an exemplary problem 2 to which the present invention can be applied, in accordance with an embodiment of the present invention.

FIG. 6 is a diagram showing an exemplary problem 2 600 to which the present invention can be applied, in accordance with an embodiment of the present invention. The present invention can be readily applied to solve problem 2 600, as described in further detail herein below. Problem 2 makes training consume more memory than expected at a given time.

If operations x and so are executed in parallel, and x is faster than so, then problem 2 occurs. In further detail, problem 2 involves needing GPU memory for both y and so.

Figure 7:
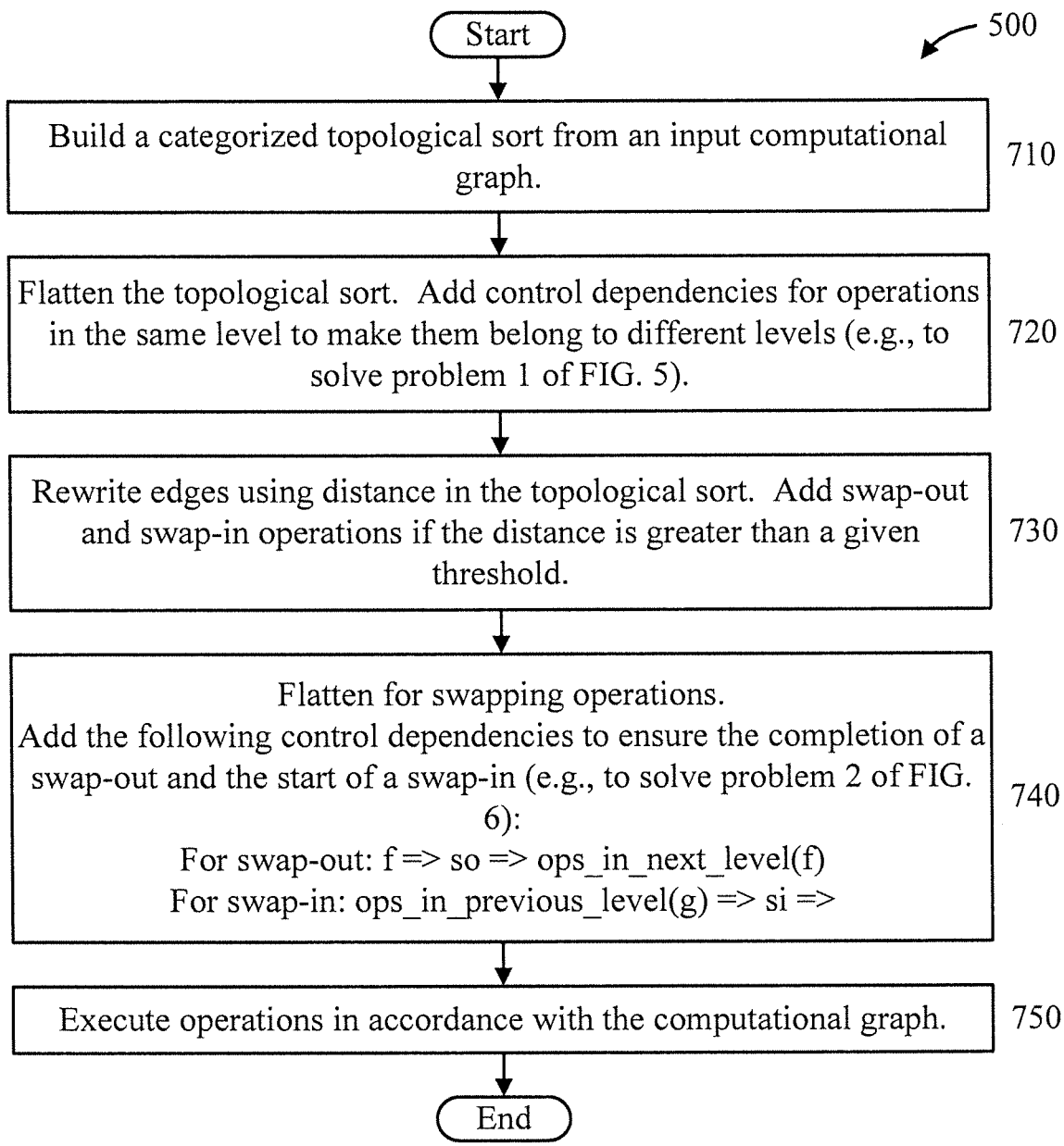
FIG. 7 is a flow diagram showing an exemplary method for graph rewriting for model support using a categorized topological sort, in accordance with an embodiment of the present invention.

FIG. 7 is a flow diagram showing an exemplary method 700 for graph rewriting for model support using a categorized topological sort, in accordance with an embodiment of the present invention.

Method 700 involves 2 flattening blocks, namely blocks 720 and 740. Block 720 flattens the topological sort, which means to add control dependencies for operations in the same level to make them belong to different levels. Block 720 is particularly suited to solving problem 1 of FIG. 5. Block 740 flattens swapping operations, which means to add control dependencies to ensure the completion of a swap-out and the start of a swap-in. Block 740 is particularly suited to solving problem 2 of FIG. 6.

Figure 8:
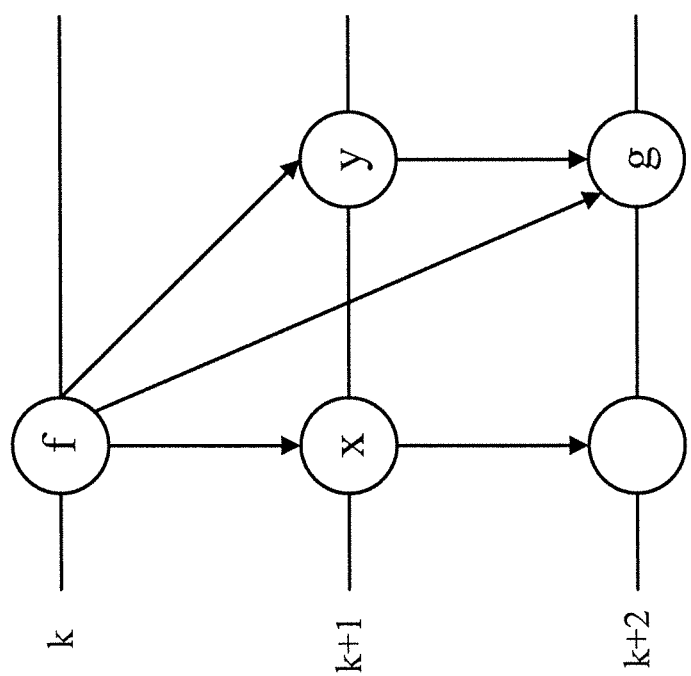
FIG. 8 is a block diagram showing an exemplary categorized topologically sorted input computational graph, in accordance with an embodiment of the present invention.

At block 710, build a categorized topological sort from an input computational graph. FIG. 8 is a block diagram showing an exemplary categorized topologically sorted input computational graph 800, in accordance with an embodiment of the present invention.

Figure 9:
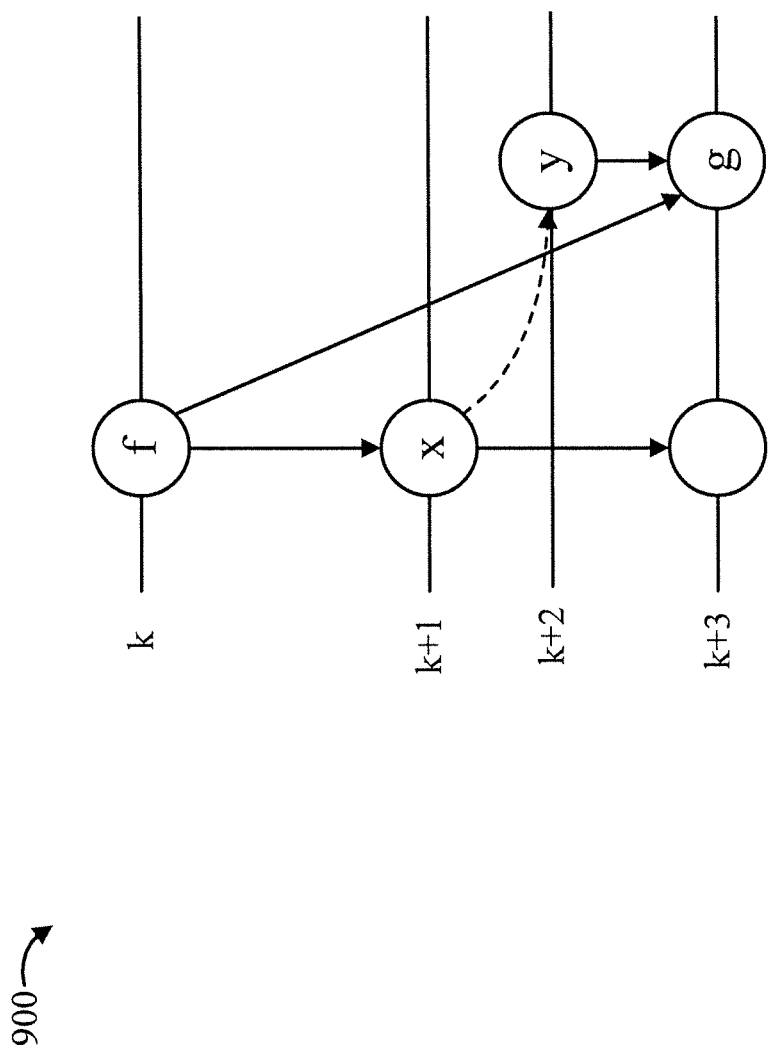
FIG. 9 is a flow diagram showing an exemplary flattened version of the categorized topologically sorted input computational graph of FIG. 8, in accordance with an embodiment of the present invention.

At block 720, flatten the topological sort. Add control dependencies for operations in the same level to make them belong to different levels (e.g., to solve problem 1 of FIG. 5). FIG. 9 is a flow diagram showing an exemplary flattened version 900 of the categorized topologically sorted input computational graph 800 of FIG. 8, in accordance with an embodiment of the present invention. The categorized topologically sorted input computational graph 800 is flattened with respect to the topological sort.

Figure 10:
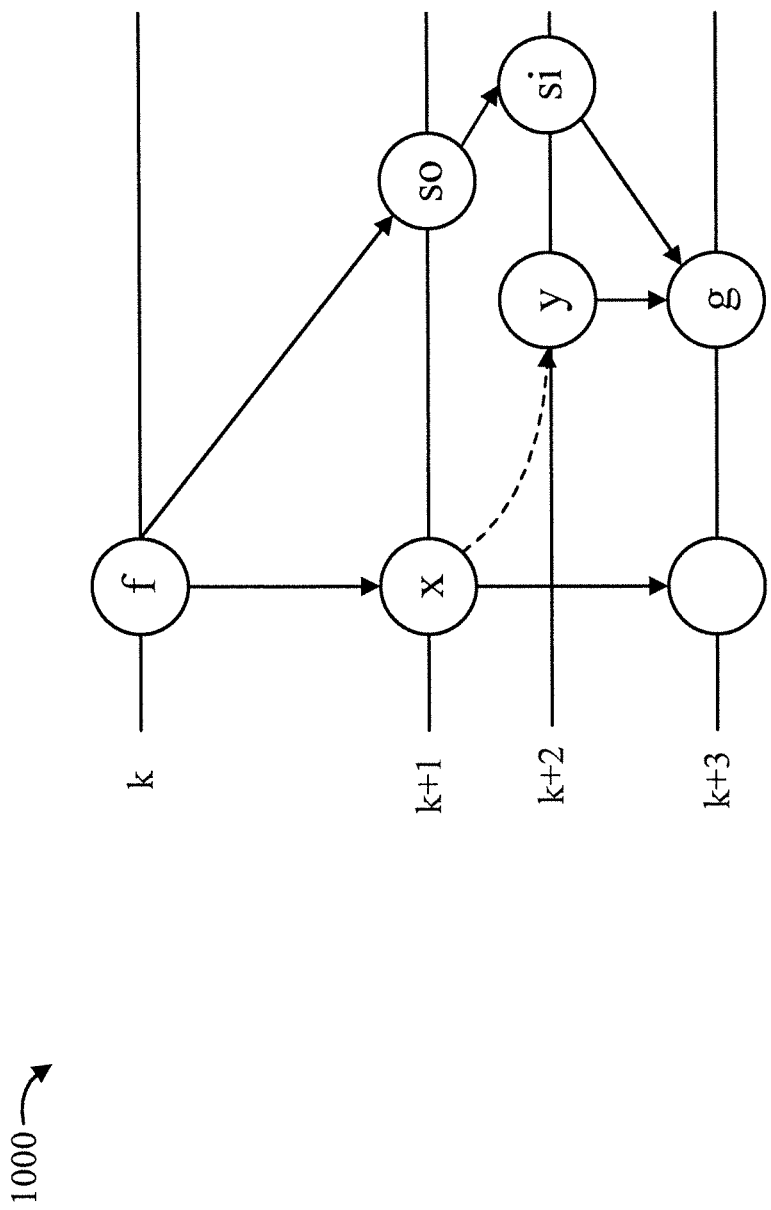
FIG. 10 is a block diagram showing an exemplary flattened and rewritten version of the categorized topologically sorted input computational graph of FIG. 8, in accordance with an embodiment of the present invention.

At block 730, rewrite edges using distance in the topological sort. Add swap-out and swap-in operations if the distance is greater than a given threshold. FIG. 10 is a block diagram showing an exemplary flattened and rewritten version 1000 of the categorized topologically sorted input computational graph 800 of FIG. 8, in accordance with an embodiment of the present invention.

Figure 11:
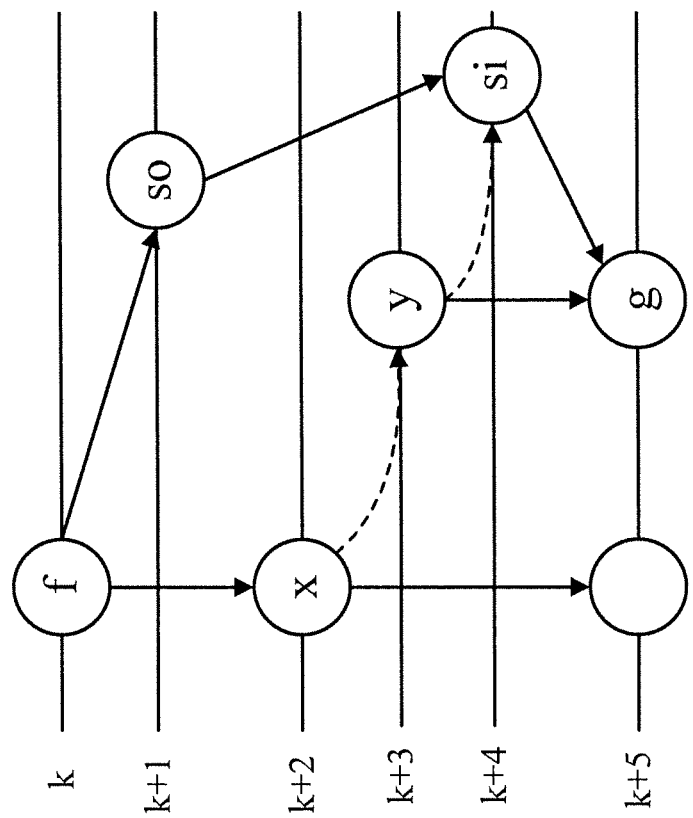
FIG. 11 is a block diagram showing an exemplary twice flattened and rewritten version of the categorized topologically sorted input computational graph of FIG. 8, in accordance with an embodiment of the present invention.

At block 740, flatten for swapping operations. FIG. 11 is a block diagram showing an exemplary twice flattened and rewritten version 1100 of the categorized topologically sorted input computational graph 800 of FIG. 8, in accordance with an embodiment of the present invention. The second flattening relates to the swapping operations.

Add the following control dependencies to ensure the completion of a swap-out and the start of a swap-in (e.g., to solve problem 2 of FIG. 6):

For swap-out: f=>so=>ops_in_next_level(f).
For swap-in: ops_in_previous_level(g)=>si=>g.

At block 750, execute operations in accordance with the computational graph. In this way, overlapping operations in relation to GPU memory consumption can be avoided or mitigated.

Figure 12:
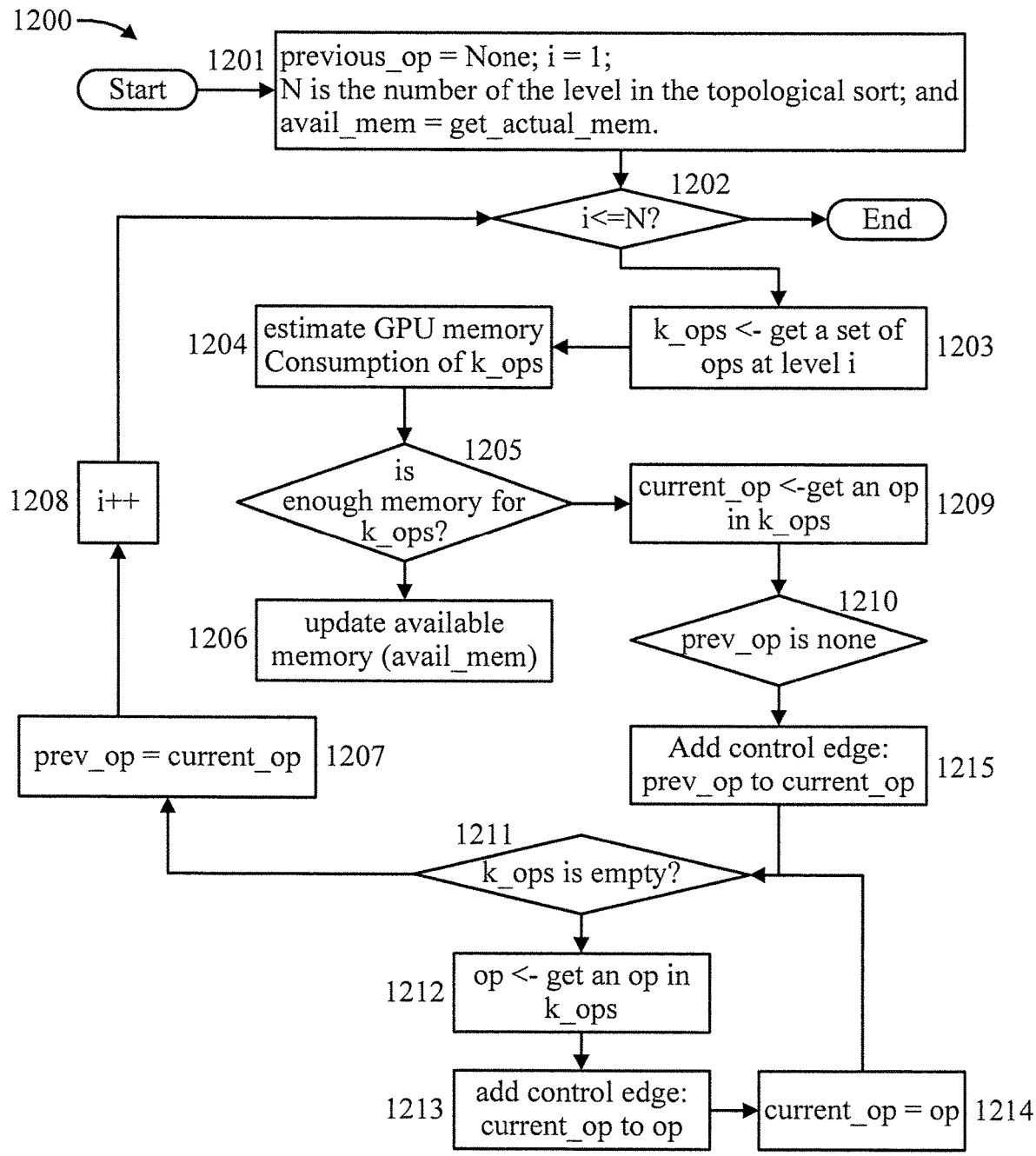
FIG. 12 is a flow diagram further showing a block of FIG. 7, in accordance with an embodiment of the present invention.

FIG. 12 is a flow diagram further showing block 720 of FIG. 7, in accordance with an embodiment of the present invention.

At block 1201:
previous_op=None;
i=1;
N is the number of the level in the topological sort; and
avail_mem=get_actual_mem.

At block 1202, determine whether N is greater than or equal to i. If so, then proceed to block 1203. Otherwise, terminate the method.

At block 1203, k_ops<- get a set of ops at level i.

At block 1204, estimate GPU memory consumption of k_ops.

At block 1205, determine if there is enough memory for k_ops. If so, then proceed to block 1206. Otherwise, proceed to block 1209.

At block 1206, update available memory (avail_mem).

At block 1207, prev_op=current_op.

At block 1208, increment i (i++).

At block 1209, current op<- get an op in k_ops (i.e., connect to the previous level).

At block 1210, determine if prev_op is none. If so, then proceed to block 1211. Otherwise proceed to 1215.

At block 1211, determine whether k_ops is empty. If so, then proceed to block 1207. Otherwise, proceed to block 1212.

At block 1212, op<- get an op in k_ops.

At block 1213, add a control edge: current_op to op (i.e., flatten the current level).

At block 1214, current_op=op.

At block 1215, add a control edge: prev_op to current_op.

Figure 13:
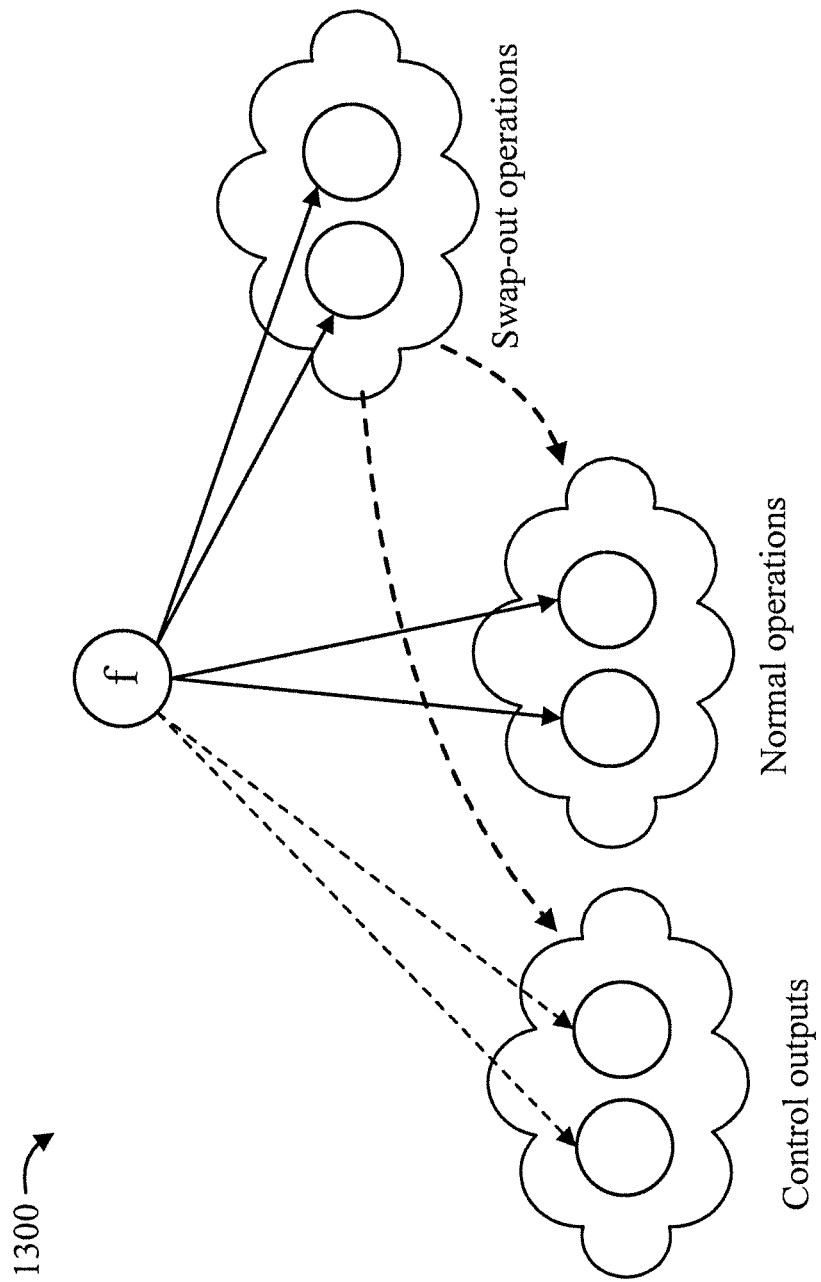
FIG. 13 is a block diagram showing exemplary swap-out operations, in accordance with an embodiment of the present invention.

FIG. 13 is a block diagram showing exemplary swap-out operations 1300, in accordance with an embodiment of the present invention. This diagram shows relationship between operations once flattening swap-out operations has been applied. Solid lines are existing control dependency edges. Dotted lines are control dependency edges that are newly added.

FIG. 14 is a diagram showing an exemplary algorithm 1400 for flattening swap-out operations, in accordance with an embodiment of the present invention. The algorithm 1400 can be used in relation to the swap-out operations 1300 of FIG. 13 or other swap-out operations.

Figure 15:
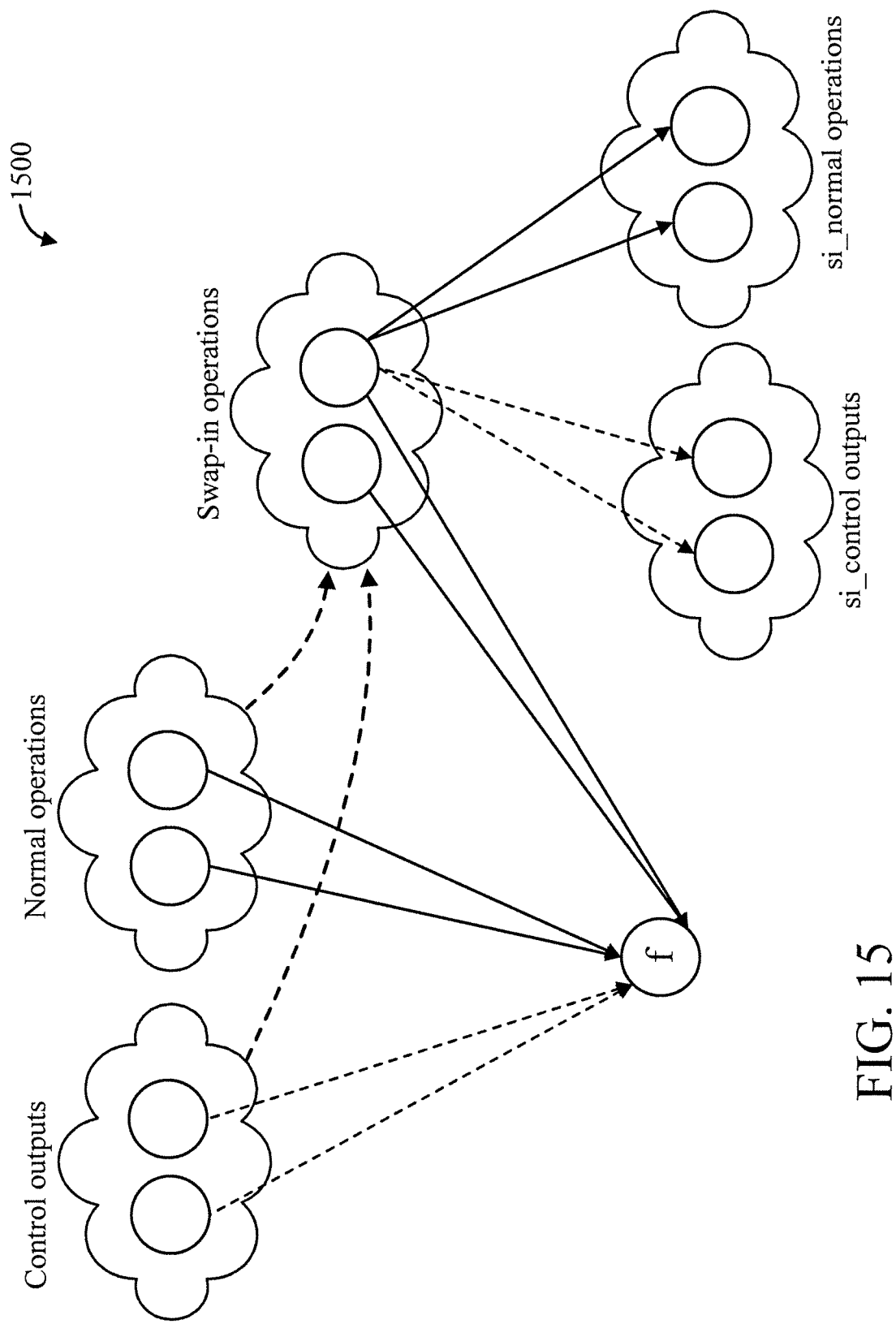
FIG. 15 is a block diagram showing exemplary swap-in operations, in accordance with an embodiment of the present invention.

FIG. 15 is a block diagram showing exemplary swap-in operations 1500, in accordance with an embodiment of the present invention. This diagram shows relationship between operations once flattening swap-in operations has been applied. Solid lines are existing control dependency edges. Dotted lines are control dependency edges that are newly added.

FIG. 16 is a diagram showing an exemplary algorithm 1600 for flattening swap-in operations, in accordance with an embodiment of the present invention. The algorithm 1600 can be used in relation to the swap-in operations 1500 of FIG. 15, or other swap-in operations. It is to be noted that "union(si_control outputs, si_normal operations" should be excluded to avoid producing cycles.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for managing GPU memory consumption by computational graph rewriting, comprising:
constructing, by a hardware processor, a categorized topological ordering of a computational graph, the categorized topological ordering including multiple computational nodes arranged in multiple levels;
estimating, by the hardware processor, the GPU memory consumption responsive to a level including two or more computational nodes from among the multiple computational nodes;
rewriting, by the hardware processor, the computational graph by linearizing the two or more computational nodes in the level to avoid overlapping of the GPU memory consumption by the two or more computational nodes responsive to the GPU memory consumption exceeding a threshold; and
managing the GPU memory consumption in accordance with the rewritten computational graph.

2. The computer-implemented method of claim 1, wherein the estimating step computes a total size of input and output tensors of all operations in the level, and the computational nodes are linearized responsive to the total size exceeding an amount of available GPU memory.

3. The computer-implemented method of claim 1, wherein the computational nodes are linearized by selectively using operations selected from the group consisting of swap-out operations and swap-in operations.

4. The computer-implemented method of claim 3, wherein the computational graph includes swap-out and swap-in nodes, which are also linearized based on an estimation of the GPU memory consumption by said estimating step.

5. The computer-implemented method of claim 1, further comprising using the categorized topological sort of the computational graph to flatten operations in a same one of the multiple levels by computing a total size of input and output tensors of all operations in the same one of the multiple levels and linearizing the computational nodes in the same one of the multiple levels responsive to the total size exceeding an amount of available GPU memory.

6. The computer-implemented method of claim 1, wherein the computational nodes are linearized by selectively using operations selected from the group consisting of swap-out operations and swap-in operations.

7. The computer-implemented method of claim 1, wherein, in the computational graph, (i) operations in a same one of the multiple levels do not depend upon each other and (ii) operations at a given one of the multiple levels do not depend on operations at higher ones of the multiple levels.

8. The computer-implemented method of claim 1, wherein the categorized topological ordering is constructed such that the larger a distance between two operations residing in GPU memory is, the longer a tensor is between the two operations.

9. The computer-implemented method of claim 8, wherein edges with the distance greater than a threshold are rewritten to implement linearization.

10. The computer-implemented method of claim 1, wherein said managing step comprises executing operations specified in the rewritten computational graph in an order specified in the rewritten computational graph.

11. A computer program product for managing GPU memory consumption by computational graph rewriting, the computer program product comprising a non-transitory computer readable storage medium having program instructions embodied therewith, the program instructions executable by a computer to cause the computer to perform a method comprising:
constructing, by a hardware processor, a categorized topological ordering of a computational graph, the categorized topological ordering including multiple computational nodes arranged in multiple levels;
estimating, by the hardware processor, the GPU memory consumption responsive to a level including two or more computational nodes from among the multiple computational nodes;
rewriting, by the hardware processor, the computational graph by linearizing the two or more computational nodes in the level to avoid overlapping of the GPU memory consumption by the two or more computational nodes responsive to the GPU memory consumption exceeding a threshold; and
managing the GPU memory consumption in accordance with the rewritten computational graph.

12. The computer program product of claim 11, wherein the estimating step computes a total size of input and output tensors of all operations in the level, and the computational nodes are linearized responsive to the total size exceeding an amount of available GPU memory.

13. The computer program product of claim 11, wherein the computational nodes are linearized by selectively using operations selected from the group consisting of swap-out operations and swap-in operations.

14. The computer program product of claim 11, wherein the computational graph includes swap-out and swap-in nodes, which are also linearized based on an estimation of the GPU memory consumption by said estimating step.

15. The computer program product of claim 11, wherein the method further comprises performing the categorized topological sort on the computational graph to flatten operations in a same one of the multiple levels by computing a total size of input and output tensors of all operations in the same one of the multiple levels and linearizing the computational nodes in the same one of the multiple levels responsive to the total size exceeding an amount of available GPU memory.

16. The computer program product of claim 11, wherein the computational nodes are linearized by selectively using operations selected from the group consisting of swap-out operations and swap-in operations.

17. The computer program product of claim 11, wherein, in the computational graph, (i) operations in a same one of the multiple levels do not depend upon each other and (ii) operations at a given one of the multiple levels do not depend on operations at higher ones of the multiple levels.

18. The computer program product of claim 11, wherein the computational graph is constructed such that the larger a distance between two operations residing in GPU memory is, the longer a tensor is between the two operations.

19. The computer program product of claim 18, wherein edges with the distance greater than a threshold are rewritten to implement linearization.

20. A computer processing system for managing GPU memory consumption by computational graph rewriting, comprising:
a memory for storing program code; and a hardware processor, operatively coupled to the memory, for running the program code to
  construct a categorized topological ordering of a computational graph, the categorized topological ordering including multiple computational nodes arranged in multiple levels;
  estimate the GPU memory consumption responsive to a level including two or more computational nodes from among the multiple computational nodes;
  rewrite the computational graph by linearizing the two or more computational nodes in the level to avoid overlapping of the GPU memory consumption by the two or more computational nodes responsive to the GPU memory consumption exceeding a threshold; and
  manage the GPU memory consumption in accordance with the rewritten computational graph.

* * * * *